(12) United States Patent
Kim

(10) Patent No.: US 9,351,097 B2
(45) Date of Patent: May 24, 2016

(54) METHOD OF CONNECTING NETWORKS USING WI-FI DIRECT IN IMAGE FORMING APPARATUS, IMAGE FORMING APPARATUS SUPPORTING WI-FI DIRECT, AND IMAGE FORMING SYSTEM

(71) Applicant: Samsung Electronics Co., Ltd., Suwon-si (KR)

(72) Inventor: Kyoung-jae Kim, Uiwang-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 56 days.

(21) Appl. No.: 14/221,837

(22) Filed: Mar. 21, 2014

(65) Prior Publication Data

US 2014/0287690 A1 Sep. 25, 2014

(30) Foreign Application Priority Data

Mar. 22, 2013 (KR) .................. 10-2013-0030993
Aug. 16, 2013 (KR) .................. 10-2013-0097351

(51) Int. Cl.
*H04B 7/00* (2006.01)
*H04W 4/00* (2009.01)
*H04W 48/14* (2009.01)

(52) U.S. Cl.
CPC .............. *H04W 4/008* (2013.01); *H04W 48/14* (2013.01)

(58) Field of Classification Search
CPC ..... H04W 84/18; H04W 48/14; H04W 4/008; H04W 76/023
USPC ....................... 455/41.1, 41.2, 41.3
See application file for complete search history.

(56) References Cited

U.S. PATENT DOCUMENTS

| | | |
|---|---|---|
| 2010/0131596 A1 | 5/2010 | Im et al. |
| 2011/0080609 A1 | 4/2011 | Park |
| 2012/0182979 A1 | 7/2012 | Vedantham et al. |

(Continued)

FOREIGN PATENT DOCUMENTS

| | | |
|---|---|---|
| EP | 2565779 | 3/2013 |
| WO | 2010/038114 | 4/2010 |

OTHER PUBLICATIONS

Extended European Search Report issued Aug. 22, 2014 in European Patent Application No. 14160163.3.

(Continued)

*Primary Examiner* — Ayodeji Ayotunde
(74) *Attorney, Agent, or Firm* — Staas & Halsey LLP

(57) ABSTRACT

A method of connecting an image forming apparatus to a network via Wi-Fi Direct, including: executing a Wi-Fi Direct function of the image forming apparatus so that the image forming apparatus operates as a soft access point (AP); displaying, when the image forming apparatus is connected to an external wireless device via the Wi-Fi Direct function, an embedded web page provided by the image forming apparatus on the connected wireless device; receiving access information of an infra network, to which the image forming apparatus is to be wirelessly connected, from the wireless device, wherein the access information is input via the displayed embedded web page; and establishing a wireless network connection between the image forming apparatus and the infrastructure network based on the access information received from the wireless device.

23 Claims, 10 Drawing Sheets

(56) References Cited

U.S. PATENT DOCUMENTS

| | | | |
|---|---|---|---|
| 2012/0252516 A1 | 10/2012 | Miyabayashi et al. | |
| 2012/0265913 A1* | 10/2012 | Suumaki et al. | 710/303 |
| 2013/0005250 A1* | 1/2013 | Kim et al. | 455/41.1 |
| 2013/0040576 A1 | 2/2013 | Yoon | |
| 2013/0057908 A1 | 3/2013 | Park | |
| 2013/0109314 A1* | 5/2013 | Kneckt et al. | 455/41.2 |
| 2013/0309971 A1* | 11/2013 | Kiukkonen | H04L 63/107 455/41.2 |

OTHER PUBLICATIONS

International Search Report and Written Opinion of the International Searching Authority dated Jun. 24, 2014 in International Application PCT/KR2014/002413.

Inventek Systems, "eS-WiFi Module Application Note AN20052", Software Enabled Access Point (SoftAP) Functionality, 12 pages (Jul. 20, 2012).

\* cited by examiner

WI-FI DIRECT SMART PHONE (GO) — WI-FI DIRECT MULTI-FUNCTION PRINTER (CLIENT) — INFRASTRUCTURED NETWORK AP

METHOD OF CONNECTING NETWORKS USING WI-FI DIRECT IN IMAGE FORMING APPARATUS, IMAGE FORMING APPARATUS SUPPORTING WI-FI DIRECT, AND IMAGE FORMING SYSTEM

CROSS-REFERENCE TO RELATED APPLICATIONS

This application claims the priority benefit of Korean Patent Application No. 10-2013-0030993, filed on Mar. 22, 2013 in the Korean Intellectual Property Office, and Korean Patent Application No. 10-2013-0097351, filed on Aug. 16, 2013 in the Korean Intellectual Property Office, the disclosures of which are incorporated herein in their entirety by reference.

BACKGROUND

1. Field

Embodiments relate to a method of connecting an image forming apparatus to a network via Wi-Fi Direct, an image forming apparatus supporting Wi-Fi Direct, and an image forming system.

2. Description of the Related Art

Recently, as wireless LAN (WLAN) technology is mounted in wireless devices, infrastructure technology of WLAN (IEEE 802.11) whereby wireless devices connect to infrastructure networks such as hot spots or access points (AP) to use the Internet has become generalized and widely used.

In addition, Wi-Fi, which is a wireless local area network (LAN) standard based on IEEE 802.11 regulated by Wi-Fi Alliance, is basically a technology that allows using ultra-high speed internet by accessing an access point (AP) connected to a network infrastructure; however, Wi-Fi may serve peer-to-peer (P2P) communication by using an ad hoc mode. When using this ad-hoc mode, however, security is weakened, a transmission speed decreases, and an establishing method thereof is difficult to perform. Accordingly, Wi-Fi Alliance has suggested Wi-Fi Direct as a technique that makes P2P communication possible. Wi-Fi Direct allows P2P connection between wireless devices without using an AP, supports a transmission speed of a maximum of 250 Mbps, and performs security settings by using Wi-Fi protected access 2 (WPA2), in order to address problems of the ad-hoc function. In addition, Wi-Fi Direct supports a transmission range of a 200 m maximum, and thus, is considered as a substitute for P2P communication.

As described above, with the appearance of Wi-Fi Direct, use of P2P communication has increased more. In addition, P2P communication technology may also be applied to image forming apparatuses, such as printers, scanners, fax machines, and multi-function printers. Accordingly, a technique for securely and easily connecting an image forming apparatus, which supports P2P connection, to a network is necessary.

SUMMARY

In an aspect of one or more embodiments, there is provided a method of connecting an image forming apparatus to a network via Wi-Fi Direct, an image forming apparatus supporting Wi-Fi Direct, and an image forming system. However, the technical objective of embodiments is not limited to the above, and other technical objectives may also be solved by embodiments.

According to an aspect of one or more embodiments, there is provided a method of connecting an image forming apparatus to a network via Wi-Fi Direct, the method including: executing a Wi-Fi Direct function of the image forming apparatus so that the image forming apparatus operates as a software access point (soft AP); displaying, when the image forming apparatus is connected to an external wireless device via the Wi-Fi Direct function, an embedded web page provided by the image forming apparatus on the connected wireless device; receiving access information of an infrastructure network, to which the image forming apparatus is to be wirelessly connected, from the wireless device, wherein the access information is input via the displayed embedded web page; and establishing a wireless network connection between the image forming apparatus and the infrastructure network based on the access information received from the wireless device.

According to an aspect of one or more embodiments, there is provided an image forming apparatus supporting Wi-Fi Direct, including: a wireless local area network (WLAN) interface unit executing a Wi-Fi Direct function so that the image forming apparatus operates as a software access point (soft AP); and a central processing unit (CPU) generating, when the image forming apparatus is connected to an externals wireless device via the Wi-Fi Direct function, an embedded web page including a list of infra networks, to which the image forming apparatus may be wirelessly connected, wherein the wireless communication interface unit provides the generated embedded web page to the connected wireless device, receives access information of the infrastructure network input via the provided embedded web page, and establishes a wireless network connection between the image forming apparatus and the infrastructure network based on the received access information.

According to an aspect of one or more embodiments, there is provided an image forming system including: an image forming apparatus that executes a Wi-Fi Direct function so that the image forming apparatus operates as a software access point (soft AP), and provides an embedded web page including a list of infra networks that can be wirelessly connected to the image forming apparatus when the image forming apparatus is connected to an external wireless device via the Wi-Fi Direct function; and a wireless device that displays the provided embedded web page, and receives access information of an infra network, to which the image forming apparatus is to be wirelessly connected via the displayed embedded web page, wherein the image forming apparatus receives the access information from the wireless device, and establishes a wireless network connection between the image forming apparatus and the infrastructure network based on the received access information.

According to an aspect of one or more embodiments, there is provided an image forming apparatus including: a wireless communication interface unit to perform a wireless communication function via which the image forming apparatus is wirelessly connected to an external wireless device; and a central processing unit (CPU) to generate, when the image forming apparatus is connected to the wireless device via the wireless communication function, an embedded web page including a list of infra networks that are wirelessly connectable to the image forming apparatus, wherein the wireless communication interface unit provides the generated embedded web page to the connected wireless device, and receives connection information of the infra networks input via the provided embedded web page, from the connected wireless device, and establishes a wireless network connection between the image forming apparatus and the infra networks based on the received connection information.

According to an aspect of one or more embodiments, there is provided a method of connecting an image forming apparatus to an infrastructure network via Wi-Fi Direct, the method including executing a Wi-Fi Direct operation of the image forming apparatus so that the image forming apparatus operates as a software access point (soft AP); connecting the image forming apparatus to an external wireless device via the Wi-Fi Direct operation; displaying on the connected wireless device an embedded web page that provides a user interface screen for setting a wireless network connection between the infrastructure network, which is one of a plurality of infrastructure networks that can be wirelessly connected to the image forming; receiving access information of the infrastructure network, to which the image forming apparatus is to be wirelessly connected, from the wireless device, wherein the access information is input via the displayed embedded web page; and establishing the wireless network connection between the image forming apparatus and the infrastructure network based on the access information received from the wireless device.

According to an aspect of one or more embodiments, there is provided at least one computer readable medium storing computer readable instructions to implement methods of embodiments.

BRIEF DESCRIPTION OF THE DRAWINGS

These and/or other aspects of embodiments will become apparent and more readily appreciated from the following description of embodiments, taken in conjunction with the accompanying drawings of which.

DETAILED DESCRIPTION

Figure 1:
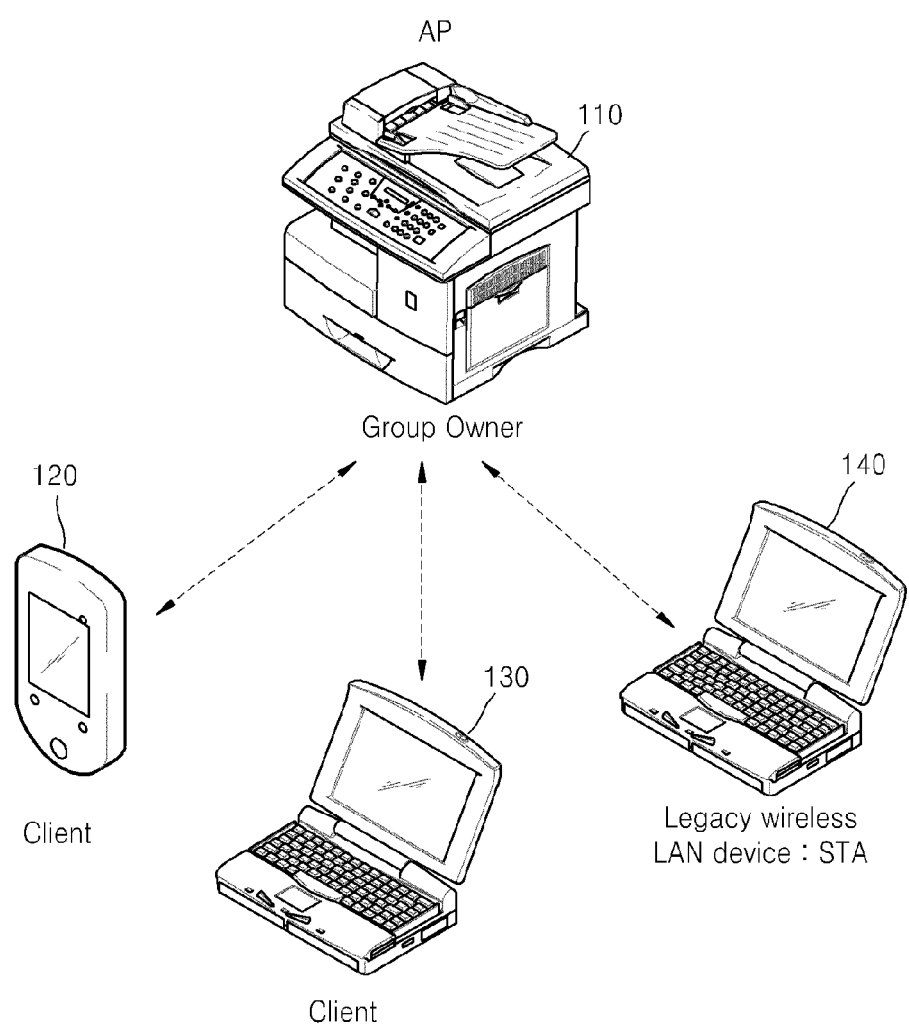
FIG. 1 illustrates wireless local area network (WLAN) devices that support Wi-Fi Direct and are wirelessly connected to one another to form a wireless network and a legacy WLAN device.

Reference will now be made in detail to embodiments, examples of which are illustrated in the accompanying drawings, wherein like reference numerals refer to the like elements throughout. Embodiments are described below to explain the present disclosure by referring to the figures.

For clarity of description of embodiments, details that are well-known to one of ordinary skill in the art will be omitted. Expressions such as "at least one of," when preceding a list of elements, modify the entire list of elements and do not modify the individual elements of the list.

Hereinafter, a multi-function printer (MFP) that supports Wi-Fi Direct will be described as an example of an image forming apparatus supporting a peer-to-peer (P2P) connection. However, an image forming apparatus according to embodiments is a concept also including other devices such as a printer, a scanner, or a facsimile, and thus, embodiments may also apply to those other devices in addition to an MFP.

Before describing embodiments, basic connections and operations of an MFP that supports Wi-Fi Direct will be described with reference to accompanying drawings.

FIG. 1 illustrates wireless local area network (WLAN) devices that are wirelessly connected to one another to form a wireless network and a legacy WLAN device. Referring to FIG. 1, an MFP 110 supporting Wi-Fi Direct is wirelessly connected to a smart phone 120 supporting Wi-Fi Direct, a laptop computer 130 supporting Wi-Fi Direct, and a legacy WLAN laptop computer 140. The legacy WLAN laptop computer 140 refers to a laptop computer, to which conventional WLAN technology is applied and which does not support Wi-Fi Direct.

WLAN devices supporting Wi-Fi Direct, hereinafter referred to as Wi-Fi Direct devices, may be P2P connected, unlike other conventional Wi-Fi supporting devices. In detail, according to the conventional Wi-Fi technology, to form a WLAN, a Wi-Fi device has to be wirelessly connected to a router connected to a network infrastructure that is already established, that is, an access point (AP). Here, Wi-Fi devices that are wirelessly connected may be regarded as acting as a station. However, according to Wi-Fi Direct, one of the Wi-Fi Direct devices that are to form a wireless network functions as an AP, and the rest of Wi-Fi Direct devices are wirelessly connected to the Wi-Fi Direct device functioning as an AP and function as stations. Accordingly, a wireless network between Wi-Fi Direct devices may be formed without an AP connected to a network infrastructure. In addition, once a wireless network is formed between Wi-Fi Direct devices, legacy WLAN devices, such as Wi-Fi devices, may recognize the Wi-Fi Direct device functioning as an AP, as an AP and wirelessly connect thereto.

Referring to FIG. 1, the Wi-Fi Direct MFP 110, the Wi-Fi Direct smart phone 120, and the Wi-Fi Direct laptop computer 130, which are Wi-Fi Direct devices, form a wireless network without an AP connected to a network infrastructure. As devices supporting Wi-Fi Direct are wirelessly connected to one another without an AP connected to a network infrastructure, a P2P group may be formed. Here, the Wi-Fi Direct MFP 110 functions as an AP, and a device that functions as an AP among the Wi-Fi Direct devices is referred to as a group owner (GO) of a P2P group. The Wi-Fi Direct smart phone 120 and the Wi-Fi Direct laptop computer 130 are wirelessly connected to the Wi-Fi Direct MFP 110, which is a GO, and function as stations that are referred to as clients. The legacy WLAN laptop computer 140, which does not support Wi-Fi Direct, recognizes the Wi-Fi Direct MFP 110, which is a GO, as an AP, so as to wirelessly connect to a wireless network that the Wi-Fi Direct devices have formed.

While the Wi-Fi Direct MFP 110 is illustrated as a GO among the Wi-Fi Direct devices in FIG. 1, according to another embodiment, other Wi-Fi Direct devices, for example, one of the Wi-Fi Direct smart phone 120 and the Wi-Fi Direct laptop computer 130, may be a GO, and the Wi-Fi Direct MFP 110 may be a client to allow wireless connection. Which Wi-Fi Direct device is going to be a GO is determined in an operation of Wi-Fi Direct connection through negotiation, as described below in detail. A Wi-Fi Direct device may become a GO by itself before being connected without negotiation, and such a Wi-Fi Direct device is referred to as an autonomous group owner (AGO). Also, a wireless network that is formed around an AGO is referred to as an autonomous P2P group. When an autonomous P2P group is formed, a legacy WLAN device may recognize the AGO as an AP of a network infrastructure and connect thereto.

While FIG. 1 illustrates a P2P group that is formed by Wi-Fi Direct devices without an AP connected to a network infrastructure, if there is an AP connected to a network infrastructure, Wi-Fi Direct devices may also connect to the AP and may function as stations.

Hereinafter, an operation of wireless connection between Wi-Fi Direct devices and characteristics of Wi-Fi Direct will be described in detail. For easy understanding, an MFP supporting Wi-Fi Direct (hereinafter, a Wi-Fi Direct MFP) will be described as an example. However, the scope of embodiments is not limited thereto, and examples of Wi-Fi Direct devices may include any devices such as a printer, a scanner, or a fax machine that supports Wi-Fi Direct. Also, while Wi-Fi Direct is described as an example of P2P communication, other P2P communication methods such as Bluetooth or Zigbee may also be regarded as being included in embodiments within an applicable range.

Figure 2:
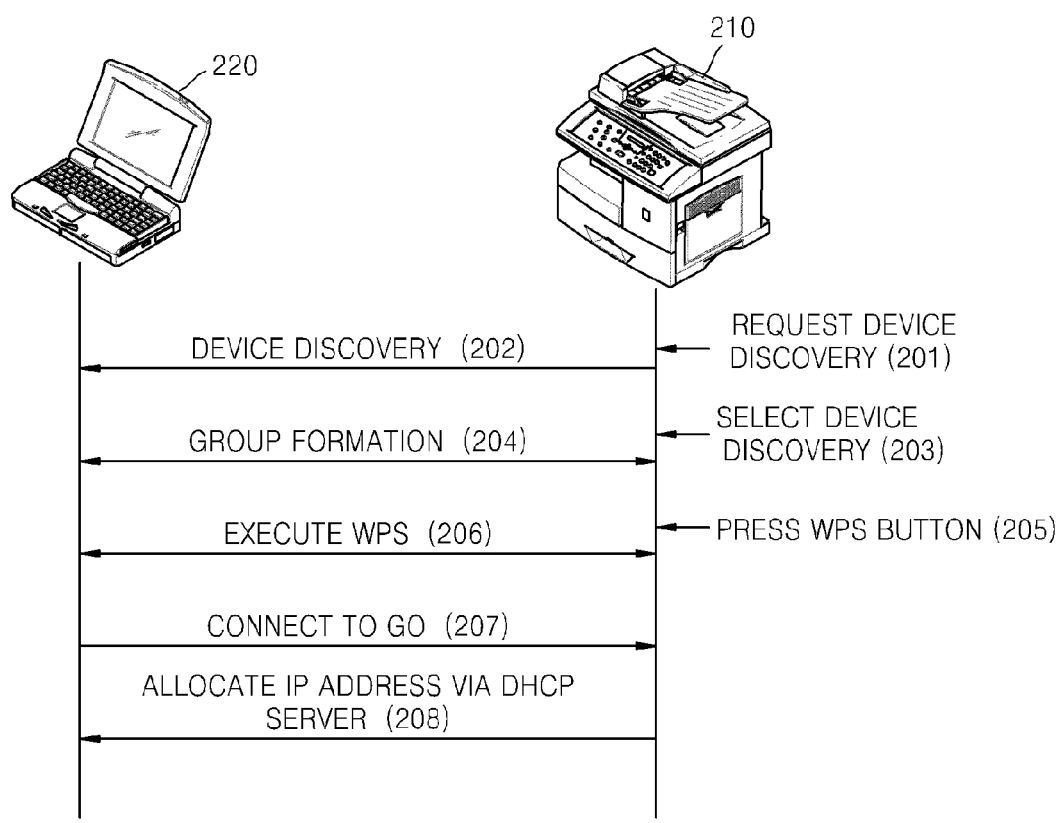
FIG. 2 is a view illustrating a typical operation of wireless connection between Wi-Fi Direct devices.

FIG. 2 is a view illustrating a typical operation of wireless connection between Wi-Fi Direct devices. In detail, a Wi-Fi direct connection between a Wi-Fi Direct MFP 210 and a Wi-Fi Direct laptop computer 220 is illustrated. The Wi-Fi Direct connection includes device discovery, group formation, and secure connection. Referring to FIG. 2, the Wi-Fi Direct MFP 210, which is one of the Wi-Fi Direct devices, receives a request 201 for device discovery, and searches whether there is a near Wi-Fi Direct device in operation 202. The request for device discovery may be received via a user interface unit of the Wi-Fi Direct MFP 210, for example, via a user interface unit implemented on a display, such as a liquid crystal display (LCD), included in the Wi-Fi Direct MFP 210. After the Wi-Fi Direct MFP 210 performs device discovery, if a near Wi-Fi Direct device is found, the Wi-Fi Direct MFP 210 shows a found device to a user on the display, and receives a connection request 203 from the user. The connection request 203 may also be received by pressing a button or by touching a touch panel via the display of the Wi-Fi Direct MFP 210, and if a plurality of Wi-Fi Direct devices are found, the Wi-Fi Direct MFP 210 may show them as a list on the display and the user may select one of them and request connection thereto.

Upon receiving the connection request 203, group formation is conducted between Wi-Fi Direct devices that are to be connected in operation 204. Group formation refers to determining which Wi-Fi Direct devices are to be connected to one another, and which of the Wi-Fi Direct devices is going to be a GO or a client. Which Wi-Fi Direct device is going to be a GO is determined through negotiation between the Wi-Fi Direct devices, as described below with reference to FIG. 4 in detail.

When groups are formed, devices of each group need secure connections, a technique for which is Wi-Fi Protected Setup (WPS). WPS refers to a function of easily establishing a secure connection between Wi-Fi supporting devices. Examples of WPS include a personal identification number (PIN) method and a push button configuration (PBC) method. In the PIN method, a previously set PIN code is input to establish a secure connection. In the PBC method, a WPS button included in a Wi-Fi Direct device is pressed to establish a secure connection.

The PCB method will be described below. A user may request secure connection by pressing a WPS button included in the Wi-Fi Direct MFP 210 in operation 205. Then, secure connection may be established by pressing a WPS button included in the Wi-Fi Direct laptop computer 220 or a WPS button implemented on an application program for Wi-Fi Direct connection of the Wi-Fi Direct laptop computer 220 within a predetermined period of time, usually within 120 seconds. The WPS button implemented on an application program for Wi-Fi Direct connection of the Wi-Fi Direct laptop computer 220 refers to an object that is displayed on a display of the Wi-Fi Direct laptop computer 220 according to an application program for Wi-Fi Direct connection. A detailed example of the WPS button is indicated by reference numeral 510 of FIG. 5 which will be described below. A user may request secure connection by clicking a WPS button displayed on a display of the Wi-Fi Direct laptop computer 220 by using a mouse or the like. When the WPS button is pressed to request secure connection, one of the Wi-Fi Direct devices that is designated as a GO in the operation of group formation transmits security information to devices that are designated as clients in operation 206. As secure connection is established by encoding security information according to the Wi-Fi Protected Access 2 (WPA2)-Pre-Shared Key (PSK) authorization method according to Wi-Fi Direct, security performance is much higher than conventional methods, such as a Wired Equivalent Privacy (WEP) method or a Wi-Fi Protected Access (WAP) method.

When conducting WPS, a Wi-Fi Direct device that is a client is connected to a Wi-Fi Direct device that is a GO in operation 207, and the Wi-Fi Direct device that is a GO uses a Dynamic Host Configuration Protocol (DHCP) server to automatically allocate an Internet protocol (IP) address to Wi-Fi Direct devices in operation 208 to thereby complete P2P connection between Wi-Fi Direct devices.

As described above, in the operation of wireless connection of Wi-Fi Direct devices, in the Wi-Fi Direct MFP 210 according to the conventional art, operation 205 of pressing a WPS button according to the PBC method or the PIN method is necessary. However, the Wi-Fi Direct MFP 210 is used mostly at homes or in offices where usually the same wireless devices of a user (e.g., the Wi-Fi Direct smart phone 120, the Wi-Fi Direct laptop computer 130, and the legacy WLAN laptop computer 140) attempt Wi-Fi Direct connection to the Wi-Fi Direct MFP 210. Accordingly, in the operation of wireless connection between Wi-Fi Direct devices of the Wi-Fi Direct MFP 210 according to the conventional art, the need for always performing operation 205 of pressing a WPS button according to the PBC method or the PIN method may inconvenience a user.

In order to remove the inconvenience to the user due to operation 205 of pressing the WPS button according to the conventional art, an operation of wireless connection between Wi-Fi Direct devices according to an embodiment is designed to omit operation 205 of pressing a WPS button once wireless devices which were successfully connected via Wi-Fi Direct.

While a basic operation for connecting between Wi-Fi Direct devices has been described above, hereinafter, each connecting operation and characteristics of Wi-Fi Direct will be described in detail with reference to the drawings.

Figure 3:
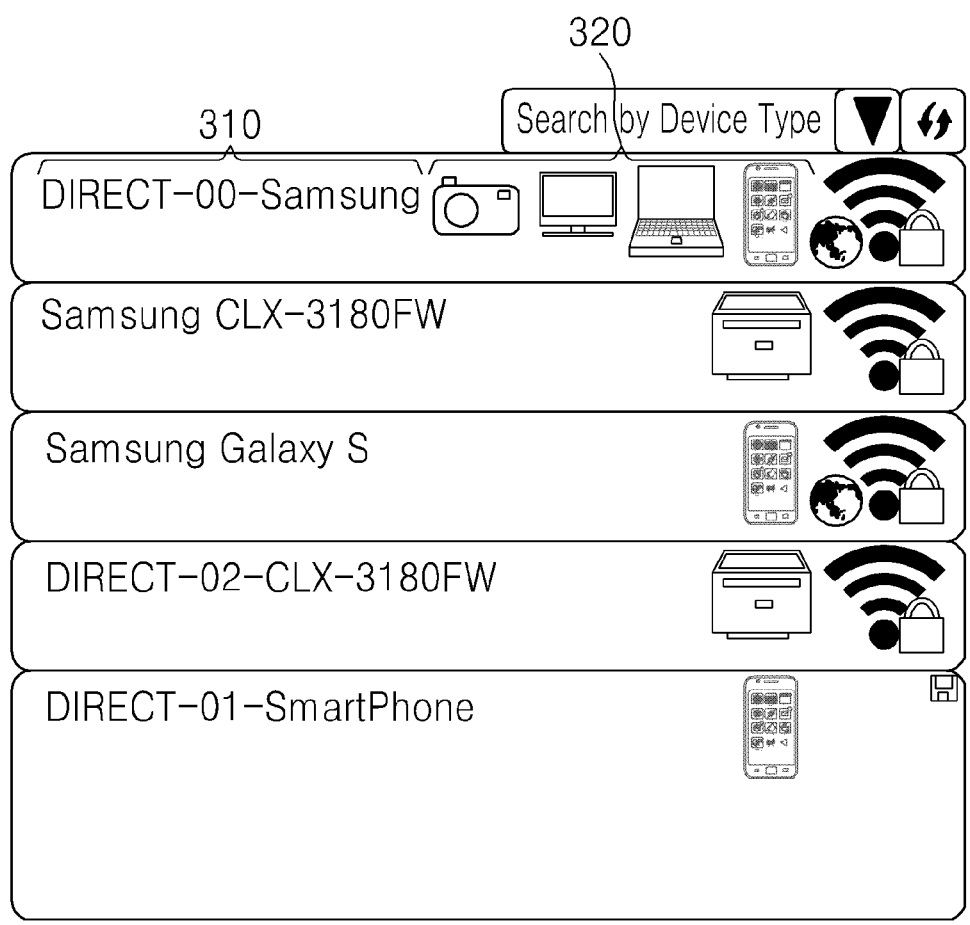
FIG. 3 illustrates a list of Wi-Fi Direct devices after performing device discovery in a Wi-Fi Direct device according to an embodiment.

FIG. 3 illustrates a list of found Wi-Fi Direct devices after performing device discovery in a Wi-Fi Direct device according to an embodiment. When the Wi-Fi Direct device conducts device discovery, device information, such as a type of a device and a service set identifier (SSID), is exchanged via a probe request and a probe response that are WLAN packets, and the device that conducts device discovery displays the collected information. As illustrated in FIG. 3, an SSID 310 and a device type 320 of Wi-Fi Direct devices that are found to be near are represented as text or icons. Here, all of the found devices may be displayed on the list; however, the devices may be filtered according to device types so that a list including only desired types of devices may be displayed. According to the Wi-Fi Direct technology, device types are classified and defined according categories. Device types are classified into categories, such as computers, input devices, printers, scanners, fax machines, copy machines, and cameras, and each category is divided into sub-categories. For example, a computer is classified into sub-categories of personal computer (PC), server, and laptop computer, and the like.

Figure 4:
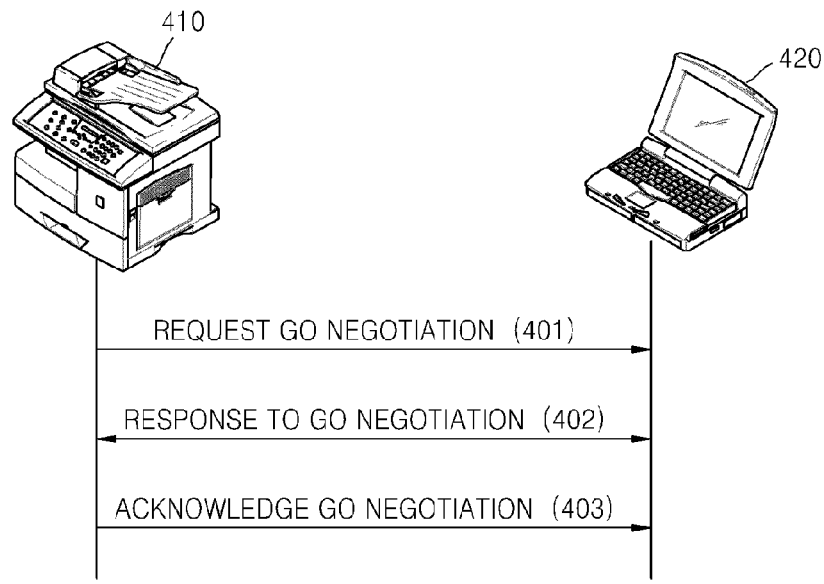
FIG. 4 is a detailed view of an operation of group formation during a connecting operation between Wi-Fi Direct devices.

FIG. 4 is a detailed view of an operation of group formation during a connecting operation between Wi-Fi Direct devices. Group formation simply refers to deciding which Wi-Fi Direct devices are to be connected to one another to form a network, which device is to be a GO, and which device is going to be a client. For example, when a Wi-Fi Direct MFP 410 conducts device discovery, and a laptop computer 420 is selected among the found Wi-Fi Direct devices to attempt connection to, the Wi-Fi Direct MFP 410 sends a GO negotiation request to the laptop computer 420 in operation 401. The laptop computer 420 that has received a GO negotiation request compares intent values of the laptop computer 420 and those of the Wi-Fi Direct MFP 410, and when the intent value of the Wi-Fi Direct MFP 410 is greater than that of the laptop computer 420, the laptop computer 420 designates the Wi-Fi Direct MFP 410 as a GO, and if the other way around, the laptop computer 420 designates itself as a GO. Here, the intent value refers to a value representing a degree of task intent in each device, and is determined by manufacturer policy and user settings. Devices to which power is supplied all the time, like an MFP, may preferably have a relatively high intent value. As described above, after determining which device is going to be a GO by comparing the intent values, the laptop computer 420 sends the corresponding result to the Wi-Fi Direct MFP 410 as a response to the GO negotiation in operation 402. The Wi-Fi Direct MFP 410 that receives the determination result transmits an acknowledgement to the laptop computer 420 in operation 403 in order to confirm the receipt of the negotiation to thereby complete the group formation. When the group formation is completed, the Wi-Fi Direct device, which is the GO, manages security information and SSIDs of the other Wi-Fi Direct devices included in the group.

Figure 5:
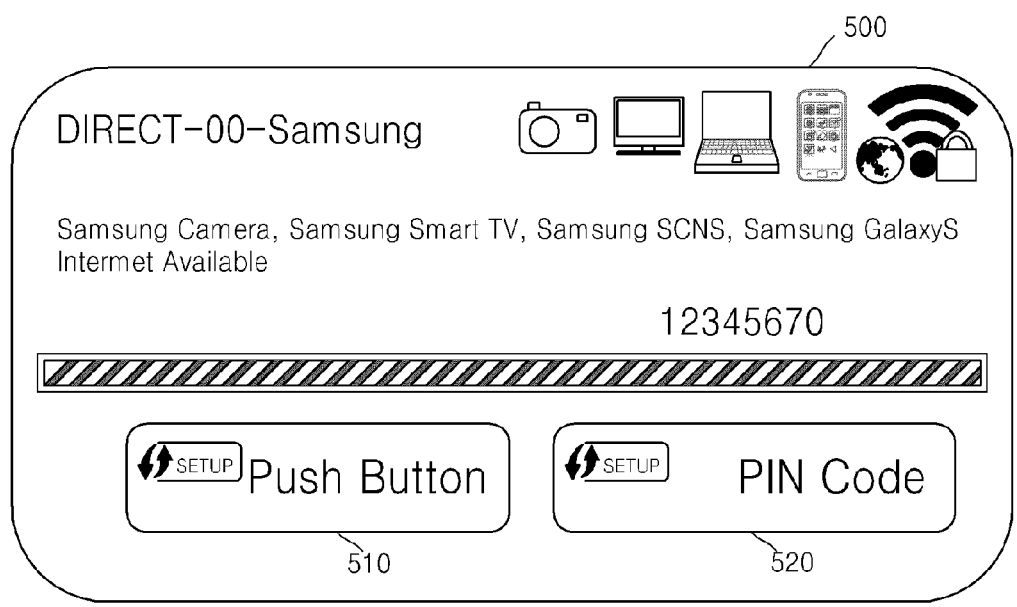
FIG. 5 illustrates a display screen for executing Wi-Fi Protected Setup (WPS)

When the group formation is completed, a secure connection is established between the Wi-Fi Direct devices included in the group through WPS. FIG. 5 illustrates a display screen 500 for executing WPS. The display screen 500 illustrated in FIG. 5 may be displayed on a user interface unit of a display of a Wi-Fi Direct MFP. Referring to FIG. 5, the user may select a WPS button 510 or a PIN code 520 to execute WPS. When executing WPS via the WPS button 510, the WPS button 510 of the Wi-Fi Direct MFP is pressed, and when WPS buttons of devices to be connected are pressed within a predetermined period of time, security information is automatically exchanged between the devices and a secure connection is established. Here, when the Wi-Fi Direct device that is the GO provides security information, the Wi-Fi Direct devices that are the clients receive the security information. Also, secure connection is established by encoding the security information using a WPA2-PSK authorization method, and thus, high security may be achieved.

However, as described above, input of the WPS button 510 of FIG. 5 may be unnecessary if Wi-Fi Direct connection is repeatedly attempted by the same wireless devices, to which the user has connected before, in the same Wi-Fi Direct environment like the home or office. Accordingly, an operation of wireless connection between Wi-Fi Direct devices according to an embodiment may be omitted in FIG. 5 with respect to the Wi-Fi Direct devices according to an embodiment.

Figure 6:
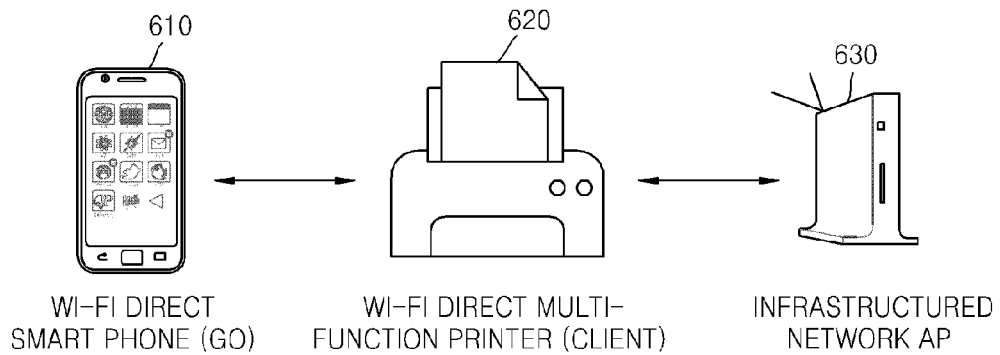
FIG. 6 illustrates Wi-Fi Direct devices that are concurrently connected.

A Wi-Fi Direct device may be connected to a network infrastructure and then may be connected to another Wi-Fi Direct device through P2P connection at the same time, and this is called concurrent connection. FIG. 6 illustrates Wi-Fi Direct devices that are concurrently connected. Referring to FIG. 6, a Wi-Fi Direct MFP 620 is connected to a smart phone 610, which is another Wi-Fi Direct device, through P2P connection, and is connected to an AP 630 of a network infrastructure at the same time. The Wi-Fi Direct MFP 620 is connected to the smart phone 610 through P2P connection, and thus may directly transmit or receive printing data or the like from the smart phone 610, and may directly transmit or receive printing data from the network infrastructure via the AP 630 at the same time.

When Wi-Fi Direct devices are concurrently connected as illustrated in FIG. 6, or when a Wi-Fi Direct device is connected using wires to a network infrastructure and also connected to another Wi-Fi Direct device through P2P connection at the same time, different IP addresses and MAC addresses may be used for each connection, that is, for connection to the network infrastructure and connection to the other Wi-Fi Direct device. This is called multihoming. This multihoming allows the Wi-Fi Direct device to support different services according to respective interfaces that are concurrently connected. For example, services of all functions of an MFP may be provided via an interface connected to the network infrastructure but only services partial functions of the MFP may be provided via an interface that is connected to another Wi-Fi Direct device.

Figure 7:
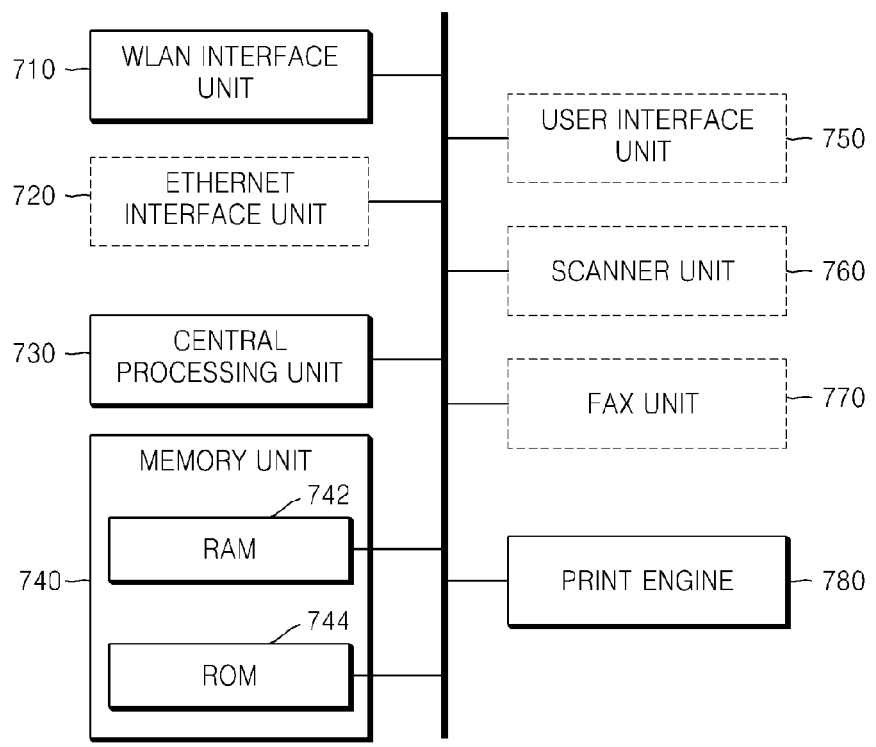
FIG. 7 is a block diagram illustrating a basic hardware structure of an image forming apparatus supporting Wi-Fi Direct.

FIG. 7 is a block diagram illustrating a basic hardware structure of an image forming apparatus supporting Wi-Fi Direct. Referring to FIG. 7, an image forming apparatus supporting Wi-Fi Direct may include a wireless communication interface unit (wireless communication interface) 710, an Ethernet interface unit (Ethernet interface) 720, a central processing unit (central processor) (CPU) 730, a memory unit (memory) 740, a user interface unit (user interface) 750, a scanner unit (scanner) 760, a fax unit 770, and a print engine 780. The memory unit 740 may include a random access memory (RAM) 742 and a read only memory (ROM) 744. If the image forming apparatus supports only WLAN, the Ethernet interface unit 720 may not be included. Also, if the image forming apparatus is a printer, the scanner unit 760 and the fax unit 770 may not be included.

The wireless communication interface unit 710 refers to hardware including various types of wireless communication modules that perform the IEEE 802.11b/g/n function or the like (e.g., a wireless LAN (WLAN) module, a near field communication (NFC) module, a Bluetooth module, or a Zigbee module), and may communicate with a main board, on which the CPU 730 is mounted, of an image forming apparatus via a universal serial bus (USB).

The Ethernet interface unit 720 refers to hardware that performs wired Ethernet communication according to IEEE 802.3. The CPU 730 controls overall operations of the image forming apparatus, and the memory unit 740 stores information for controlling the MFP and print data to be read when it is necessary. The user interface unit 750 functions as a medium for the user to identify information of the image forming apparatus and to input a command to the image forming apparatus. The user interface unit 750 may be configured in various ways according to products. For example, the user interface unit 750 may be simply configured as two or four lines on a display, such as an LCD or a light-emitting diode (LED) display, or may be implemented as a graphic user interface (GUI) so as to represent various graphics. The scanner unit 760, the fax unit 770, and the print engine 780 are hardware for performing functions of a scanner, a fax machine, and a printer.

Figure 8:
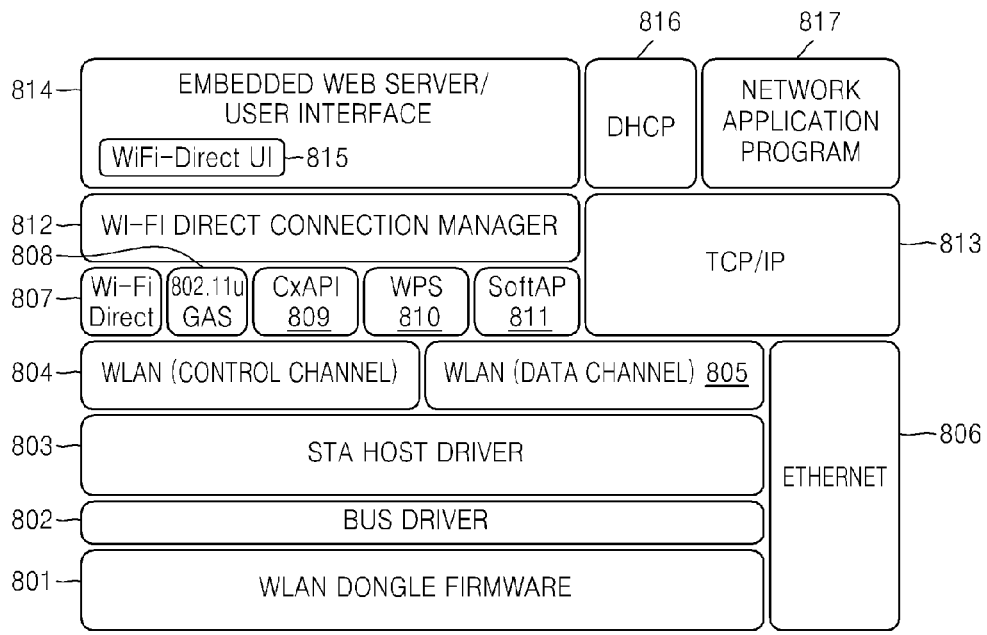
FIG. 8 is a block diagram illustrating a basic software structure of an image forming apparatus supporting Wi-Fi Direct.

FIG. 8 is a block diagram illustrating a basic software structure of an image forming apparatus supporting Wi-Fi Direct. The elements of software of an image forming apparatus supporting Wi-Fi Direct will be briefly described below with reference to FIG. 8.

A WLAN dongle firmware 801 is firmware for WLAN connection, which may be stored in WLAN dongle hardware or may be transmitted from a main board of an image forming apparatus to the WLAN dongle hardware when booting the image forming apparatus. A bus driver 802 and a serial ATA (STA) host driver 803 are each a low level bus driver for communication with WLAN hardware. A WLAN control channel 804 and a WLAN data channel 805 refer to channels for communicating with WLAN firmware. A Wi-Fi Direct module 807 is a module that conducts Wi-Fi Direct connection and provides an operating command to the WLAN firmware. An IEEE 802.11u generic advertisement service (GAS) module 808 performs functions according to IEEE 802.11u GAS, and a WPS module 810 performs a WPS function. A CxAPI module 809 is an application programming interface made of C language. A soft AP module 811 is a software module that helps an image forming apparatus to act as an AP. A transmission control protocol (TCP)/IP 813 is a standard protocol for network transmission. A Wi-Fi Direct connection manager 812 is a module for controlling Wi-Fi Direct connection. A Wi-Fi Direct user interface 815 allows the user to conduct settings related to Wi-Fi Direct, and may be included in an embedded web server (EWS)/user interface 814. A DHCP server 816 automatically allocates an IP to a Wi-Fi Direct device that is connected as a client. A network application program 817 allows various application operations related to a network.

The Wi-Fi Direct technology described above has the following advantages.

The Wi-Fi Direct device is connectable to other devices anywhere and anytime, and thus, has maximum mobility and portability. If a new Wi-Fi Direct device is added, the Wi-Fi Direct device may be immediately connected to the new Wi-Fi Direct device and used. In addition, it may be identified whether there is an available device or service before establishing the connection to other devices, and thus, the Wi-Fi direct devices may be conveniently used. In addition, the connection may be performed simply and stably by a simple operation, for example, pressing a WPS button, and the connection may be performed with high security functions by using the WPA2 technology.

Also, Wi-Fi Direct technology may provide various functions that may not be provided by the conventional WLAN technology.

For example, the device discovery function whereby near Wi-Fi Direct devices may be found according to device types; the service discovery function whereby services provided by near Wi-Fi Direct devices may be found; a power management function that allows efficient use of power; the concurrent connection function that may form a P2P connection between the Wi-Fi Direct devices while connecting to an existing network infrastructure; a function of separating a security domain between the connection to the network infrastructure connection and the Wi-Fi Direct connection; and a cross-connection function which allows sharing of internet connection may be provided by the Wi-Fi Direct technology.

Also, as the Wi-Fi Direct technology is based on IEEE 802.11, the Wi-Fi Direct devices are compatible with conventional legacy WLAN devices.

As described above, an image forming apparatus includes a wired LAN (Ethernet) interface unit or a wireless communication interface unit (the wireless communication interface unit 710 or Ethernet interface unit 720 of FIG. 7), and thus may be connected to an infrastructure network. In the case of a wired connection, an image forming apparatus may be connected to an infrastructure network simply by using an IP set up via a wired LAN (Ethernet) interface unit. However, in the case of wireless connection, an image forming apparatus may connect to an infrastructure network by searching for a nearby AP and selecting a desired AP, and then inputting security information (e.g., a password).

If an image forming apparatus includes the user interface unit 750 (see FIG. 7) formed as a GUI, the image forming apparatus may execute a wireless connection process in a stand alone manner by inputting access information for an infrastructure network via the GUI. However, if an image forming apparatus does not include the user interface unit 750 such as a GUI or a keypad, the image forming apparatus may install and execute a wireless setup exclusive application stored in, for example, an additional universal serial bus (USB) device to achieve the wireless connection. However, this requires a complex USB connection for wireless connection to an infrastructure wireless network, and moreover, an application that is exclusively for a wireless setup has to be additionally installed, making it inconvenient and complicated for the user of the image forming apparatus to connect to an infrastructure network.

According to an embodiment, in order to prevent the above inconvenience which occurs when an image forming apparatus not including the user interface unit 750 such as a GUI or a keypad is to be wirelessly connected to an infrastructure network, a wireless connection setup of an image forming apparatus is executed through a relay including a typical wireless device (e.g., PC, laptop computer, smartphone, or tablet computer) which is connected via Wi-Fi Direct, so that the image forming apparatus may easily connect to an infrastructure network.

Hereinafter, specific functions and operations in regard to a method of connecting an image forming apparatus to a network via Wi-Fi Direct, an image forming apparatus supporting Wi-Fi Direct, and an image forming system will be described in detail with reference to FIGS. 9 through 14.

While description below will focus on Wi-Fi Direct, embodiments are not limited to the Wi-Fi Direct but may also be similarly applied to P2P connection of other various methods such as Ad-hoc, NFC, Bluetooth, Zigbee, or the like.

Figure 9:
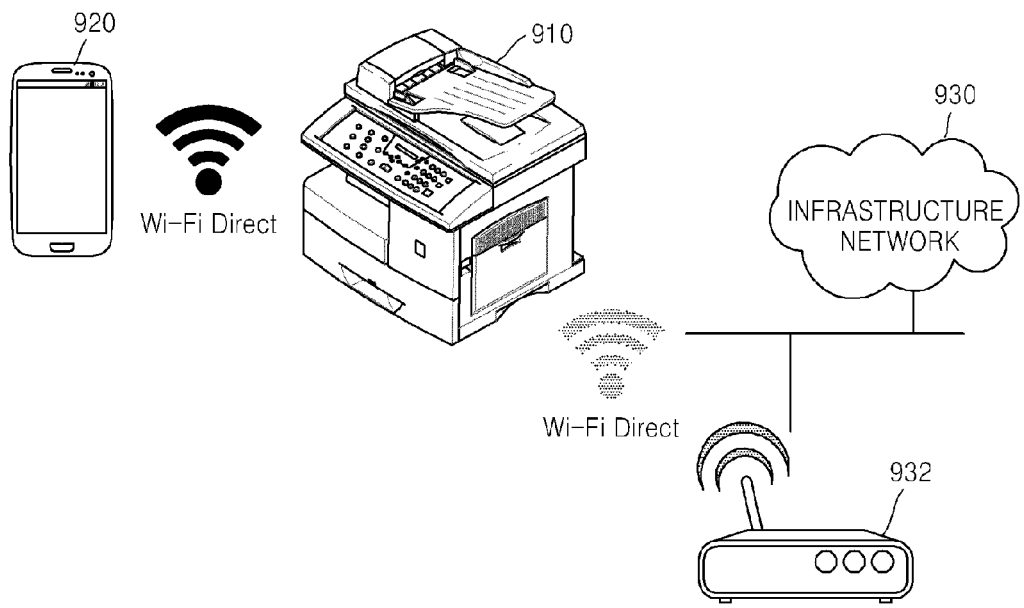
FIG. 9 illustrates an image forming system according to an embodiment.

FIG. 9 is a schematic view of an image forming system 900 according to an embodiment. In order to ensure clarity with respect to the characteristics of an embodiment, only hardware components related to an embodiment will be described with reference to FIG. 9. However, it will be obvious to one of ordinary skill in the art that other general-use hardware components other than those illustrated in FIG. 9 may also be included in the image forming system 900.

Referring to FIG. 9, an image forming apparatus 910, a wireless device 920, an infrastructure network 930 (wireless network), and an AP 932 are included in the image forming system 900. The wireless device 920 is a Wi-Fi Direct device that supports a Wi-Fi function, and may be, for example, a typical PC, a laptop computer, a smartphone, or a tablet computer. The infrastructure network 930 may be various types of wired or wireless networks that are typically established, such as a home network environment or a company network environment. To be connected to the infrastructure network 930 in a wireless manner, wireless connection of the image forming apparatus 910 may be set via the AP 932.

The image forming apparatus 910 may be connected to the infrastructure network 930 in a wired manner via a wired LAN interface unit (not shown) or a USB module (not shown). Also, as described above, the image forming apparatus 910 may be wirelessly connected to the infrastructure network 930 by using the AP 932 as a medium.

In order for the image forming apparatus 910 to be wirelessly connected to the infrastructure network 930 via the AP 932, the user has to set up a wireless connection in the image forming apparatus 910 with respect to the infrastructure network 930; for example, the user has to input an SSID or a password of the infrastructure network 930.

According to the image forming apparatus 910 of an embodiment, operations and functions needed for wireless connection of the image forming apparatus 910 to the infrastructure network 930 will be described under the assumption of embodiments in which a user interface unit (not shown) such as a GUI or a keypad via, which a user may input information or via which information may be displayed to the user, is not included, or in which just a simple user interface unit (for example, simple buttons or a 2-line or 4-line display) is included. However, one or more embodiments may also be applied when a user interface unit such as a GUI or a keypad is included in the image forming apparatus 910.

The image forming apparatus 910 executes a Wi-Fi Direct function so as to operate as a soft AP (or group owner (GO)) when power is supplied (Power-On).

When the image forming apparatus 910 operates as a soft AP, the image forming apparatus 910 may be searched for as one of devices included in a list of Wi-Fi Direct-connectable devices, in the wireless device 920 which is near the image forming apparatus 910.

When the wireless device 920 has requested connection to the image forming apparatus 910 via a Wi-Fi Direct function, the image forming apparatus 910 and the wireless device 920 undergo the above-described operations, for example, the operations described with reference to FIG. 2 or FIG. 4, and then a wireless connection between the image forming apparatus 910 and the wireless device 920 is established via Wi-Fi Direct.

When the image forming apparatus 910 is connected to the wireless device 920 via a Wi-Fi Direct function, the wireless device 920 displays an embedded web page (or a custom remote UI (RUI)) provided by the image forming apparatus 910.

In detail, an embedded web page provided by the image forming apparatus 910 may be a web page provided to the wireless device 920 via a web redirection function of the image forming apparatus 910. A web redirection function is a technique of displaying an embedded web page that is forcibly provided by the image forming apparatus 910 upon all hypertext transfer protocol (HTTP) access requests in the wireless device 920 as the wireless device 920, which is connected to the image forming apparatus 910 via Wi-Fi Direct, attempts web connection via a web browser or as a web browser is forcibly executed in the wireless device 920. Accordingly, if the wireless device 920 is connected to the image forming apparatus 910 via Wi-Fi Direct, a user of the wireless device 920 may be able to easily access an embedded web page provided by the image forming apparatus 910 even though the user does not know a network address (IP address) of the image forming apparatus 910.

However, as described above, according to an embodiment, when the image forming apparatus 910 and the wireless device 920 are connected via wireless communication methods other than Wi-Fi Direct, the wireless device 920 may also be provided with an embedded web page by web redirection. For example, an embedded web page may also be provided by web redirection to the wireless device 920 via a P2P connection by other various methods such as Ad-hoc, NFC, Bluetooth, and Zigbee. The description below will focus on web redirection of the image forming apparatus 910 whereby an embedded web page is provided via a Wi-Fi Direct function; however, it will be obvious to one of ordinary skill in the art that web redirection of the image forming apparatus 910 may also be applied to embodiments where the P2P connection of other various methods such as Ad-hoc, NFC, Bluetooth, or Zigbee rather than Wi-Fi Direct is used.

The image forming apparatus 910 providing an embedded web page to the wireless device 920 via web redirection as described in an embodiment is just an example. That is, when the image forming apparatus 910 and the wireless device 920 are connected via Wi-Fi Direct or other P2P communication methods, and as long as an embedded web page provided by the image forming apparatus 910 may be displayed on the wireless device 920, the image forming apparatus 910 may provide the embedded web page to the wireless device 920 not only via web redirection but also by using other methods, and it would be obvious to one of ordinary skill in the art that these possibilities are also included in embodiments. However, for convenience of description, web redirection will be described as an example below, and embodiments are not limited thereto.

As described above, an embedded web page displayed on the wireless device 920 via web redirection is a web page that provides a user interface screen for setting a wireless network connection between one of infrastructure networks that can be wirelessly connected to the image forming apparatus 910 (e.g., the infrastructure network 930) and the image forming apparatus 910.

That is, when the wireless device 920 is connected to the image forming apparatus 910 via a Wi-Fi Direct function, an embedded web page provided via web redirection of the image forming apparatus 910 is displayed on the wireless device 920 via a web browser of the wireless device 920.

The user may directly input access information for wireless connection between the image forming apparatus 910 and the infrastructure network 930 via an embedded web page displayed on the wireless device 920. Here, the access information for wireless connection includes any information needed for network connection such as identification information of the infrastructure network 930 (e.g., an SSID) or connection password information.

Accordingly, the image forming apparatus 910 may input access information for indirectly wirelessly connecting to the infrastructure network 930 by using the wireless device 920.

The image forming apparatus 910 receives access information that is input via an embedded web page displayed on the wireless device 920. Then, a wireless network connection is established between the image forming apparatus 910 and the infrastructure network 930 based on the received access information.

Accordingly, even when a user interface unit (not shown) such as a GUI or a keypad is not included in the image forming apparatus 910, access information for network connection may be indirectly input (or set) through communication via a Wi-Fi Direct function with respect to the wireless device 920, and thus, the image forming apparatus 910 may easily wirelessly connect to the infrastructure network 930.

Figure 10:
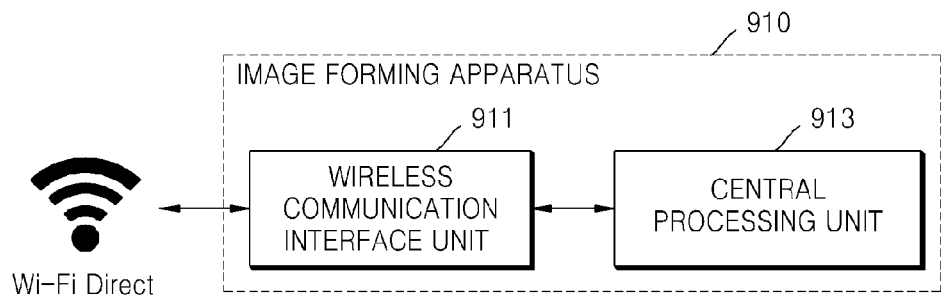
FIG. 10 is a structural diagram of an image forming apparatus supporting Wi-Fi Direct, according to an embodiment.

FIG. 10 is a structural diagram of the image forming apparatus 910 supporting Wi-Fi Direct, according to embodiment. Referring to FIG. 10, the image forming apparatus 910 includes only hardware components related to the current embodiment, from among the hardware components of the image forming apparatus illustrated in FIG. 7. However, it will be obvious to one of ordinary skill in the art that hardware components that are described with reference to the image forming apparatus of FIG. 7 but are omitted in FIG. 10 may also be applied to the image forming apparatus 910 of FIG. 10.

A wireless communication interface unit 911 executes a Wi-Fi Direct function so that the image forming apparatus 910 operates as a soft AP. The wireless communication interface unit 911 refers to hardware including various types of wireless communication modules that operate based on the IEEE 802.11b/g/n standards (e.g., a WLAN module, an NFC module, a Bluetooth module, or a Zigbee module).

A central processing unit (CPU) 913 is a hardware component that is implemented as at least one processor. When the image forming apparatus 910 is connected to the wireless device 920 via a Wi-Fi Direct function, the CPU 913 generates an embedded web page including a list of infrastructure networks that may be wirelessly connected to the image forming apparatus 910. However, as described above, the CPU 913 may generate an embedded web page for web redirection not only for a Wi-Fi Direct connection but also for other wireless communication methods such as an Ad-hoc connection or an NFC connection.

The wireless communication interface unit 911 provides the generated embedded web page to the wireless device 920. The generated embedded web page is a web page that is provided via a web redirection function of the image forming apparatus 910. Also, the generated web page is a web page that provides a user interface screen for setting a wireless network connection between one of infrastructure networks that can be wirelessly connected to the image forming apparatus 910 and the image forming apparatus 910.

The Wireless communication interface unit 911 receives, from the wireless device 920, access information of the infrastructure network 930 that is input via the embedded web page displayed on the wireless device 920.

Then, the wireless communication interface unit 911 sets up a wireless network connection between the image forming apparatus 910 and the infrastructure network 930 based on the access information received from the wireless device 920. After finishing communication with respect to the wireless device 920 via a Wi-Fi Direct function in advance, the image forming apparatus 910 may complete the wireless network connection between the image forming apparatus 910 and the infrastructure network 930.

Figure 11:
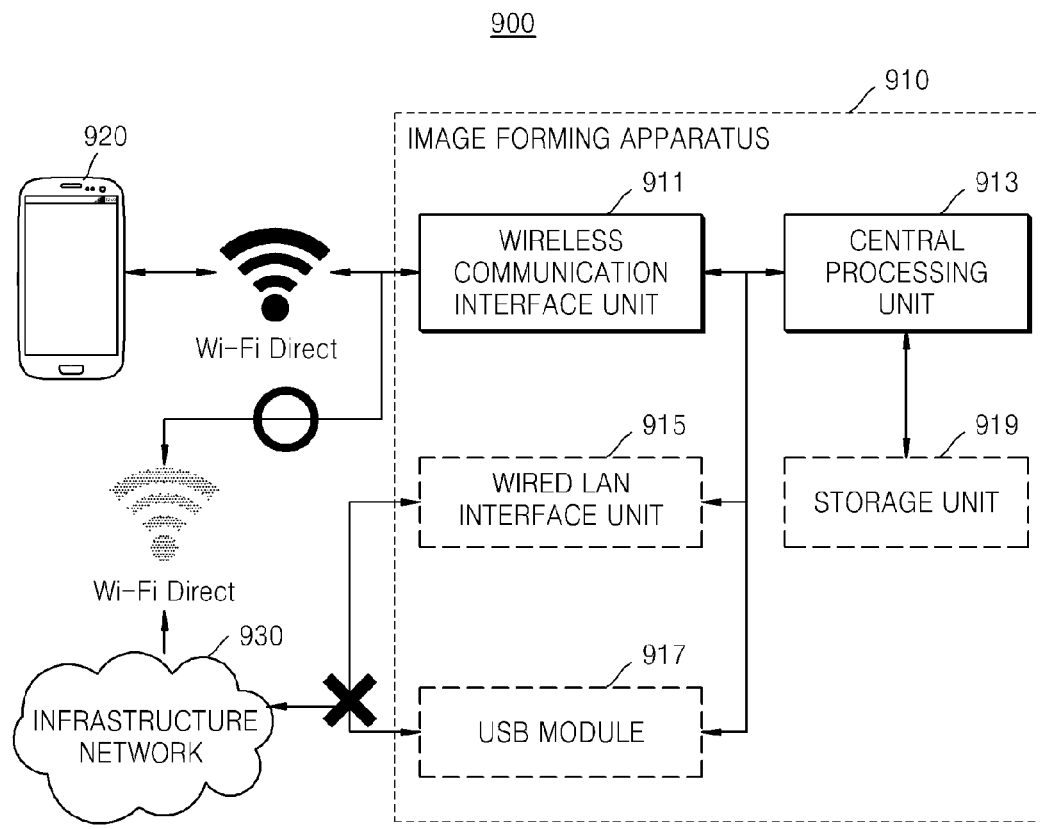
FIG. 11 is a detailed view for explaining an operation between an image forming apparatus, a wireless device, and an infrastructure network in an image forming system according to an embodiment.

FIG. 11 is a detailed view for explaining an operation between an image forming apparatus 910, a wireless device 920, and an infrastructure network 930 in an image forming system 900, according to an embodiment.

Referring to FIG. 11, the image forming system 900, the image forming apparatus 910, the wireless device 920, and the infrastructure network 930 included in the image forming system 900 are identical to those corresponding units included in the image forming system 900 illustrated in FIG. 9.

Referring to FIG. 11, the image forming apparatus 910 only includes hardware components related to the current embodiment, from among the hardware components of the image forming apparatus illustrated in FIG. 7. However, it will be obvious to one of ordinary skill in the art that hardware components that are described with reference to the image forming apparatus of FIG. 7 but are omitted in FIG. 11 may also be applied to the image forming apparatus 910 according to an embodiment. Also, the image forming apparatus 910 illustrated in FIG. 11 further includes some components that are not included in the image forming apparatus 910 illustrated in FIG. 10, but these components are illustrated only for the purpose of explaining operations of units of the image forming system 900 in detail.

The image forming apparatus 910 may be connected to the infrastructure network 930 in a wired manner via a wired LAN interface unit 915 or the USB module 917. However, if the wired LAN interface unit 915 or the USB module 917 is not available for use or if it is complicated to use them, the user may want to wirelessly connect the image forming apparatus 910 to the infrastructure network 930 via the wireless communication interface unit 911.

However, as assumed above, if no user interface unit (not shown) such as a GUI or keypad is included in the image forming apparatus 910, or if just a simple user interface is used, an application, which is exclusively for a wireless set up, may be received via the USB module 917 and have to be installed, and there may be no other way to wirelessly connect the image forming apparatus 910 to the infrastructure network 930. To solve this problem, the image forming apparatus 910 may connect to the infrastructure network 930 by communicating with the wireless device 920 via a Wi-Fi Direct function.

When a state of the image forming apparatus 910 is converted from a power-off state to a power-on state, a Wi-Fi Direct function of the wireless communication interface unit 911 of the image forming apparatus 910 (or a network interface unit) is activated.

The CPU 913 of the image forming apparatus 910 determines whether the image forming apparatus 910 is connected to the infrastructure network 930 via the wired LAN interface unit 915 (or the network interface unit) or the USB module 917.

When it is determined that the image forming apparatus 910 is not connected to the infrastructure network 930, the wireless communication interface unit 911 of the image forming apparatus 910 operates as a soft AP.

When the wireless device 920 is located within a communication range of Wi-Fi Direct of the image forming apparatus 910, in the wireless device 920, the image forming apparatus 910 is searched for as one of devices included in a list including devices that may be connected via Wi-Fi Direct.

When the wireless device 920 has requested connection to the image forming apparatus 910 via a Wi-Fi Direct function, the image forming apparatus 910 and the wireless device 920 undergoes the above-described operations, for example, the operations described with reference to FIG. 2 or FIG. 4, and then a wireless connection between the image forming apparatus 910 and the wireless device 920 is established via Wi-Fi Direct.

Thereafter, the wireless communication interface unit 911 searches for a list of nearby infrastructure networks which can be wirelessly connected to the image forming apparatus 910.

The CPU 913 generates an embedded web page including information about a list of searched infrastructure networks. The generated embedded web page is a web page that provides a user interface screen for setting a wireless network connection between one of infrastructure networks that can be wirelessly connected to the image forming apparatus 910, for example, the infrastructure network 930, and the image forming apparatus 910.

The storage unit 919 may store platforms of embedded web pages for generating a user interface screen as described in advance, and the CPU 913 may read out the platforms stored in advance in the storage unit 919 when generating an embedded web page, to thereby generate an embedded web page including a user interface screen as described above. Also, the storage unit 919 may store all kinds of data that is processed in the embedded web page generated by using the CPU 913 or other portions of the image forming apparatus 910.

The image forming apparatus 910 provides the generated embedded web page to the wireless device 920 via web redirection by using the Wi-Fi Direct function of the wireless communication interface unit 911. However, as described above, the image forming apparatus 910 may provide the wireless device 920 with an embedded web page via web redirection not only via a Wi-Fi Direct function of the wireless communication interface unit 911 but also via other wireless communication functions such as an Ad-hoc function or an NFC function.

Accordingly, the wireless device 920 displays the embedded web page provided via web redirection. This operation is performed in order to attempt to establish a wireless connection to the infrastructure network 930 as the image forming apparatus 910 is not connected to the infrastructure network 930 in a wired manner via the wired LAN interface unit 915 or the USB module 917.

The embedded web page displayed on the wireless device 920 via the web redirection function is a web page that provides a user interface screen for setting a wireless network connection between one of infrastructure networks that can be wirelessly connected to the image forming apparatus 910 (e.g., the infrastructure network 930) and the image forming apparatus 910.

That is, when the wireless device 920 is connected to the image forming apparatus 910 via Wi-Fi Direct while the image forming apparatus 910 is not connected to the infrastructure network 930 via the wired LAN interface unit 915 or the USB module 917 in a wired manner, an embedded web page provided via web redirection of the image forming apparatus 910 is displayed in the wireless device 920 via a web browser of the wireless device 920.

The user may directly input access information for wireless connection between the image forming apparatus 910 and the infrastructure network 930 via the embedded web page displayed on the wireless device 920. Here, the access information for wireless connection includes any information needed for network connection such as identification information of the infrastructure network 930 (e.g., an SSID) or connection password information.

The wireless communication interface unit 911 of the image forming apparatus 910 receives access information that is input via the embedded web page displayed on the wireless device 920.

The wireless communication interface unit 911 attempts to connect to the infrastructure network 930 by using the access information received from the wireless device 920.

As a result of the connection attempt, if connection to the infrastructure network 930 is possible, the wireless communication interface unit 911 finishes connection between the image forming apparatus 910 and the wireless device 920 via Wi-Fi Direct. As the connection between the image forming apparatus 910 and the wireless device 920 is ended, the operation of the image forming apparatus 910 as a soft AP may also end.

When the connection between the image forming apparatus 930 and the wireless device 920 is ended, the wireless communication interface unit 911 establishes a wireless network connection between the image forming apparatus 910 and the infrastructure network 930 again based on the received access information.

Accordingly, even when a user interface unit (not shown) such as a GUI or a keypad is not included in the image forming apparatus 910, the image forming apparatus 910 may be wirelessly connected to the infrastructure network 930 by indirectly setting access information with respect to the infrastructure network 930 through communication with the wireless device 920 via Wi-Fi Direct.

Figure 12:
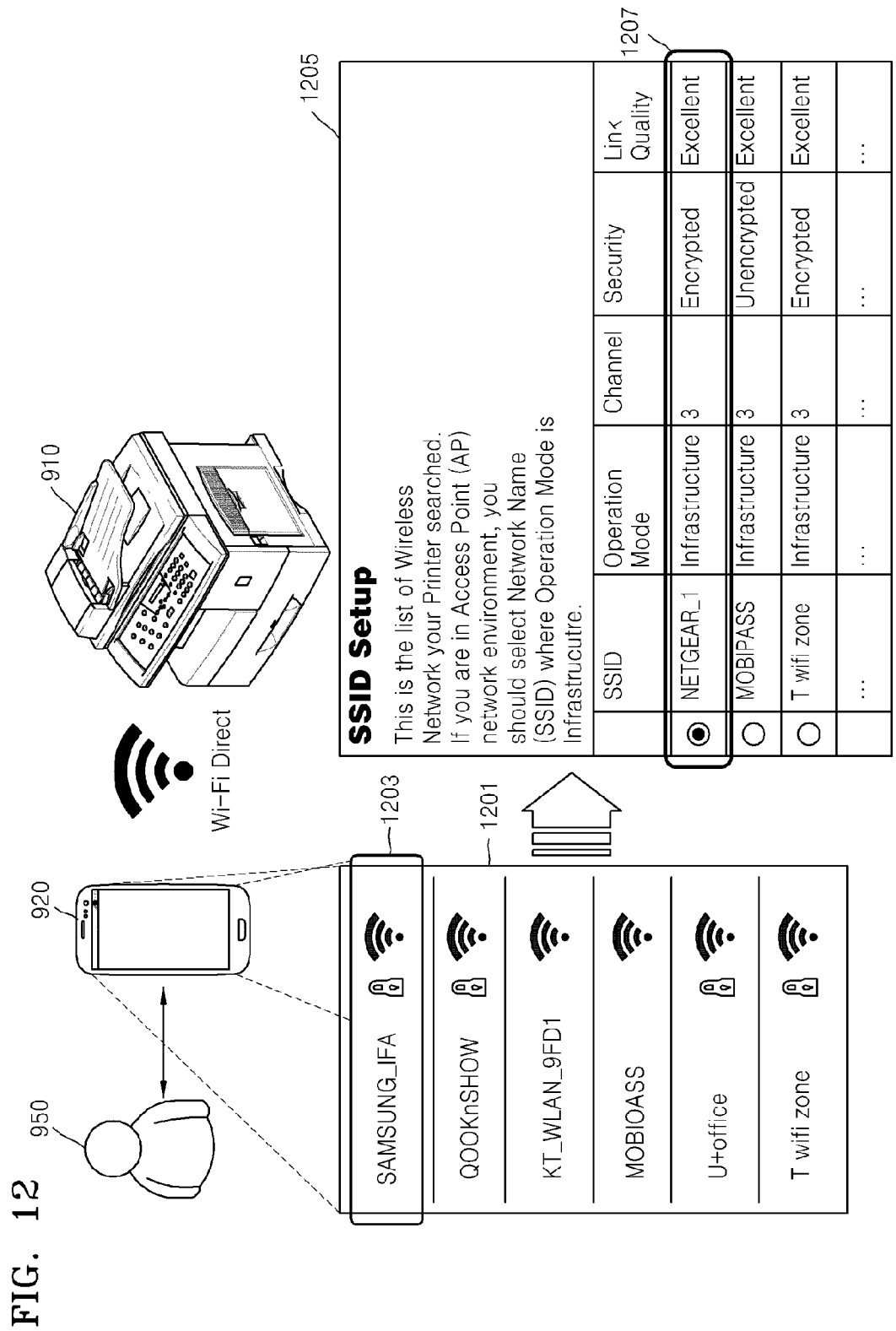
FIG. 12 is a view for explaining an embedded web page displayed on a wireless device via web redirection of an image forming apparatus according to an embodiment.

FIG. 12 is a view for explaining an embedded web page displayed on a wireless device 920 via web redirection of an image forming apparatus 910, according to an embodiment.

Referring to FIG. 12, while the image forming apparatus 910 operates as a soft AP, a user interface screen 1201 displaying a list of peripheral devices which can be connected via Wi-Fi Direct is displayed in the wireless device 920. On the user interface screen 1201, an SSID 1203 of the image forming apparatus 910 that is operating as a soft AP (SAMSUNG_IFA) is displayed.

When a user 950 selects the SSID 1203 (SAMSUNG_IFA) of the image forming apparatus 910 displayed on the user interface unit 1201, the image forming apparatus 910 and the wireless device 920 are wirelessly connected via Wi-Fi Direct.

When the image forming apparatus 910 and the wireless device 920 are wirelessly connected, an embedded web page 1205 provided via web redirection of the image forming apparatus 910 is displayed in the wireless device 920. As described above, the embedded web page 1205 includes information about infrastructure networks to which the image forming apparatus 910 may be wirelessly connected.

The user 950 may directly input access information 1207 (an SSID, a pass word, etc.) for wireless connection with respect to the infrastructure network 930 that is to be connected to the image forming apparatus 910 from among infrastructure networks that may be wirelessly connected, via the embedded web page 1205.

According to an embodiment, even when access information of the infrastructure network 930 cannot be directly input to the image forming apparatus 910, the user 950 may easily establish a wireless connection between the image forming apparatus 910 and the infrastructure network 930 by using the wireless device 920.

Figure 13:
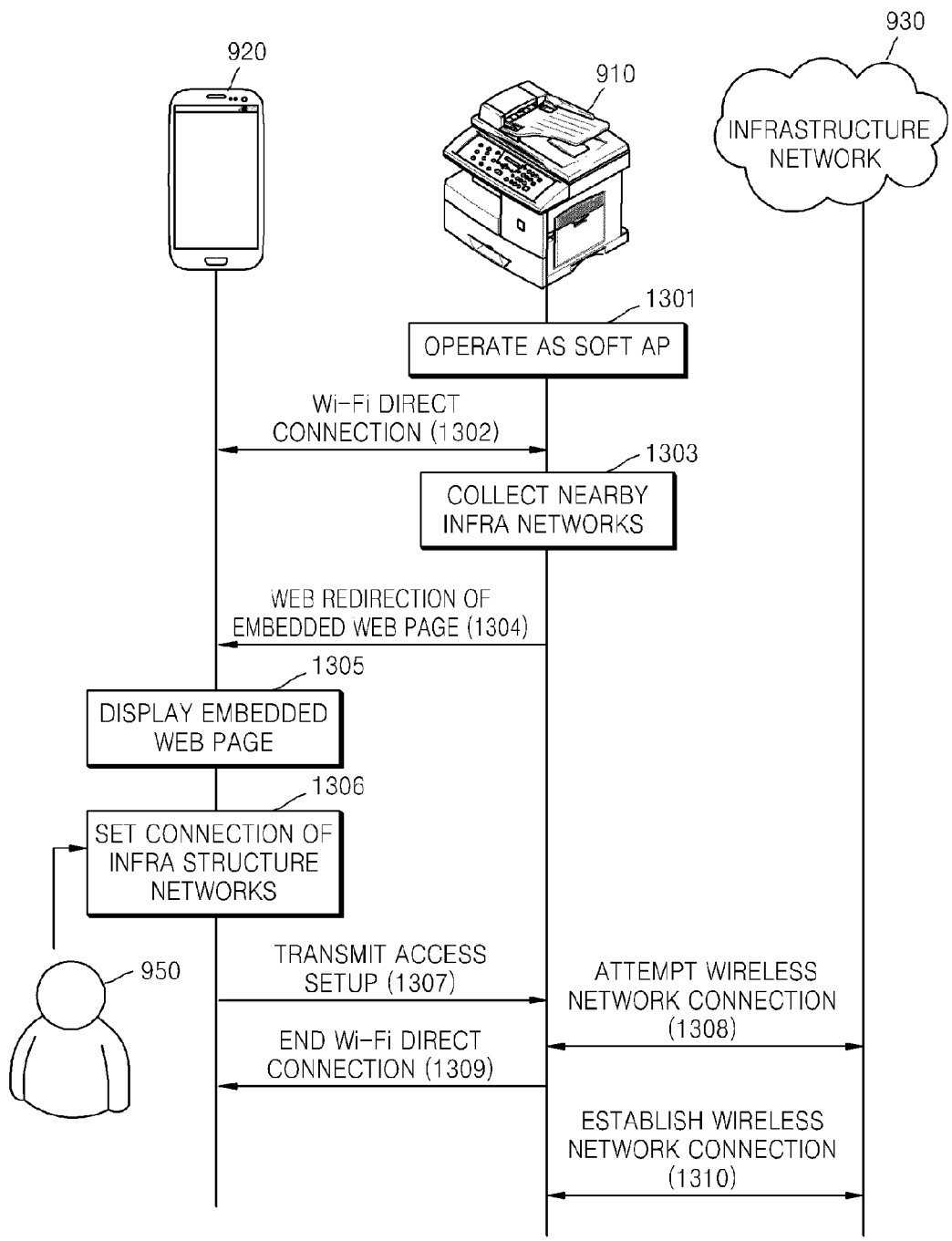
FIG. 13 is a view illustrating an operation between an image forming apparatus, a wireless device, and an infrastructure network in order to wirelessly connect the image forming apparatus to the infrastructure network, according to an embodiment.

FIG. 13 is a view illustrating an operation between an image forming apparatus 910, a wireless device 920, and an infrastructure network 930 in order that the image forming apparatus 910 is wirelessly connected to the infrastructure network 930, according to an embodiment. Operations described below with reference to FIG. 13 may be those operations that are processed in a time series manner in the image forming system 900 described above with reference to FIGS. 9 through 12. Thus, details that are omitted below but described in regard to the general Wi-Fi Direct technology with reference to FIGS. 1 through 8 and details described with reference to FIGS. 9 through 12 may be applied to FIG. 13.

In operation 1301, when the image forming apparatus 910 is not connected to the infrastructure network 930 in a wired manner, the wireless communication interface unit 911 of the image forming apparatus 940 activates a Wi-Fi Direct function so that the image forming apparatus 910 operates as a soft AP.

In operation 1302, when the wireless device 920 is located within a communication range of Wi-Fi Direct of the image forming apparatus 910, the image forming apparatus 910 is searched for as one of devices of a list including devices that may be connected via Wi-Fi Direct, in the wireless device 920. When the wireless device 920 has requested connection to the image forming apparatus 910 via a Wi-Fi Direct function, the image forming apparatus 910 and the wireless device 920 undergo the above-described operations, for example, the operations described with reference to FIG. 2 or FIG. 4, and then a wireless connection between the image forming apparatus 910 and the wireless device 920 is established via Wi-Fi Direct.

In operation 1303, the wireless communication interface unit 911 searches for nearby infrastructure networks that can be connected to the image forming apparatus 910, and as a result of the search, a list of nearby infrastructure networks that can be wirelessly connected (SSIDs of nearby infrastructure networks, security information, etc.) is collected.

In operation 1304, the CPU 913 of the image forming apparatus 910 generates an embedded web page including information about a list of collected infrastructure networks. The embedded web page is a web page that provides a user interface screen for setting a wireless network connection between one of infrastructure networks to which the image forming apparatus 910 may be connected and the image forming apparatus 910.

Then, the image forming apparatus 910 provides the generated embedded web page to the wireless device 920 via web redirection.

In operation 1305, the wireless device 920 displays an embedded web page provided via web redirection.

In operation 1306, a user 950 directly inputs access information for wireless connection between the image forming apparatus 910 and the infrastructure network 930 via the embedded web page displayed on the wireless device 920. Here, the access information for wireless connection includes any information needed for network connection such as identification information of the infrastructure network 930 (e.g., an SSID) or connection password information.

In operation 1307, the wireless device 920 transmits the access information input via Wi-Fi Direct, to the image forming apparatus 910. That is, the wireless communication interface unit 911 of the image forming apparatus 910 receives the input access information via the embedded web page displayed on the wireless device 920.

In operation 1308, the wireless communication interface unit 911 attempts to connect to the infrastructure network 930 based on the access information received from the wireless device 920.

In operation 1309, if connection to the infrastructure network 930 is possible as a result of the connection attempt, the wireless communication interface unit 911 ends Wi-Fi Direct connection between the image forming apparatus 910 and the wireless device 920. As the connection between the image forming apparatus 910 and the wireless device 920 is ended, the operation of the image forming apparatus 910 as a soft AP may also end.

In operation 1310, when the connection between the image forming apparatus 930 and the wireless device 920 is ended, the wireless communication interface unit 911 establishes a wireless network connection between the image forming apparatus 910 and the infrastructure network 930 again, based on the received access information.

Figure 14:
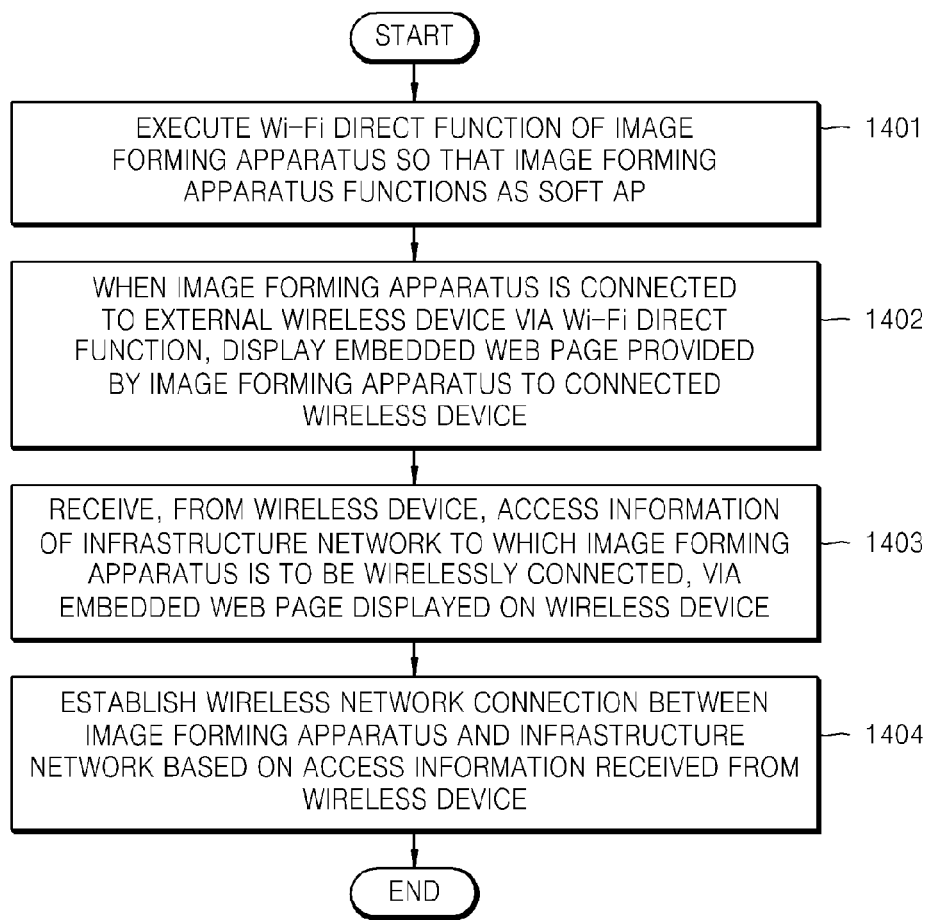
FIG. 14 is a flowchart illustrating a method of connecting an image forming apparatus to a network, via Wi-Fi Direct, according to an embodiment.

FIG. 14 is a flowchart illustrating a method of connecting an image forming apparatus 910 to a network, via Wi-Fi Direct, according to an embodiment. Referring to FIG. 14, operations of the method of connecting the image forming apparatus 910 to a network according to an embodiment may be those operations that are processed in a time series manner in the image forming system 900 described above with reference to FIGS. 9 through 13. Thus, details that are omitted below but described in regard to the general Wi-Fi Direct technology with reference to FIGS. 1 through 8 and details described with reference to FIGS. 9 through 13 may be applied to FIG. 14.

In operation 1401, the image forming apparatus 910 executes a Wi-Fi Direct function so as to operate as a soft AP.

In operation 1402, when the image forming apparatus 910 is connected to the wireless device 910 via a Wi-Fi Direct function, the wireless device 920 displays an embedded web page provided by the image forming apparatus 910.

In operation 1403, the image forming apparatus 910 receives, from the wireless device 920, access information of an infrastructure network to which the image forming apparatus 910 is to be wirelessly connected, via the embedded web page displayed on the wireless device 910.

In operation 1404, the image forming apparatus 910 establishes a wireless network connection between the image forming apparatus 910 and the infrastructure network 930, based on the access information received from the wireless device 920.

According to embodiments, even when an image forming apparatus does not include an input unit such as a graphic user interface (GUI) or a keypad or includes just simple buttons, access information needed for wireless connection of the image forming apparatus to an infrastructure network via communication by using a Wi-Fi Direct function may be input or set, and thus, the image forming apparatus may be easily wirelessly connected to the infrastructure network.

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

While exemplary embodiments have been particularly shown and described, it will be understood by one of ordinary skill in the art that various changes in form and details may be made therein and that embodiments should be considered in a descriptive sense only and not for purposes of limitation.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A method of connecting an image forming apparatus to an infrastructure network via a peer to peer (P2P) connection, the method comprising: executing a P2P function of the image forming apparatus so that the image forming apparatus operates as a software access point (soft AP); displaying, when the image forming apparatus is connected to an external wireless device via the P2P function, an embedded web page provided by the image forming apparatus on the connected wireless device; receiving access information of the infrastructure network, to which the image forming apparatus is to be wirelessly connected, from the wireless device, wherein the access information is input via the displayed embedded web page; attempting connection to the infrastructure network by using the access information received from the wireless device, wherein the attempting is performed by the image forming apparatus; ending the connection between the image forming apparatus and the wireless device via the P2P function, if connection to the infrastructure network is possible as a result of the connection attempt; and establishing a wireless network connection between the image forming apparatus and the infrastructure network based on the access information received from the wireless device, when the connection between the image forming apparatus and the wireless device is ended.

2. The method of claim 1, wherein in the displaying, when the image forming apparatus is connected to the wireless device via the P2P function, the embedded web page provided via web redirection of the image forming apparatus is displayed on the connected wireless device.

3. The method of claim 1, wherein the displayed embedded web page is a web page that provides a user interface screen for setting a wireless network connection between the infrastructure network, which is one of a plurality of infrastructure networks that can be wirelessly connected to the image forming apparatus and the image forming apparatus.

4. The method of claim 1, wherein in the displaying, when the image forming apparatus is not connected to the infrastructure network via at least one of a network interface unit and a universal serial bus (USB) module, the embedded web page provided via web redirection of the image forming apparatus is displayed in the connected wireless device.

5. The method of claim 4, further comprising: determining, if a state of the image forming apparatus is converted from a power-off state to a power-on state, whether the image forming apparatus is connected to the infrastructure network via at least one of the network interface unit and the USB module, wherein the determining is performed by the image forming apparatus, wherein if it is determined that the image forming apparatus is not connected to the infrastructure network, the embedded web page is provided to the wireless device via the web redirection.

6. The method of claim 1, wherein the received access information comprises at least one of identification information and connection password information of the infrastructure network that is to be wirelessly connected.

7. The method of claim 1, further comprising ending an operation of the image forming apparatus as the soft AP when the connection between the image forming apparatus and the wireless device is ended.

8. The method of claim 1, further comprising: searching for a list of infrastructure networks that can be wirelessly connected to the image forming apparatus, in the image forming apparatus, when the image forming apparatus is connected to the wireless device via the P2P function; and generating the embedded web page including information about the list of the searched infrastructure networks, wherein the generating is performed by the image forming apparatus, wherein in the displaying, the embedded web page generated in the image forming apparatus is displayed on the connected wireless device via web redirection.

9. An image forming apparatus supporting a peer to peer (P2P) connection, comprising: a wireless local area network (WLAN) interface unit which executes a P2P function so that the image forming apparatus operates as a software access point (soft AP); and a central processing unit (CPU) which generates, when the image forming apparatus is connected to an externals wireless device via the P2P function, an embedded web page including a list of infrastructure networks, to which the image forming apparatus may be wirelessly connected, wherein the wireless communication interface unit provides the generated embedded web page to the connected wireless device, receives access information of the infrastructure network input via the provided embedded web page, and establishes a wireless network connection between the image forming apparatus and the infrastructure network based on the received access information, wherein the wireless communication interface unit attempts to connect to the infrastructure network by using the access information received from the wireless device; and ends the connection between the image forming apparatus and the wireless device via the P2P function, if connection to the infrastructure network is possible as a result of the connection attempt, and wherein the wireless communication interface unit establishes a wireless network connection between the image forming apparatus and the infrastructure network when the connection between the image forming apparatus and the wireless device is ended.

10. The image forming apparatus of claim 9, wherein the wireless communication interface unit provides the embedded web page to the connected wireless device via web redirection when the image forming apparatus is connected to the wireless device via the P2P function.

11. The image forming apparatus of claim 9, wherein the displayed embedded web page is a web page that provides a user interface screen for setting a wireless network connection between one of the infrastructure networks, to which the image forming apparatus may be wirelessly connected, and the image forming apparatus.

12. The image forming apparatus of claim 9, wherein the wireless communication interface unit provides the generated embedded web page to the connected wireless device when the image forming apparatus is not connected to the infrastructure network via at least one of the wireless communication interface unit and a universal serial bus (USB) module.

13. The image forming apparatus of claim 12, wherein: a central processing unit (CPU) determines, if a state of the image forming apparatus is converted from a power-off state to a power-on state, whether the image forming apparatus is connected to the infrastructure network via at least one of the network interface unit and the USB module, and the wireless communication interface unit provides the embedded web page to the wireless device via the web redirection if it is determined that the image forming apparatus is not connected to one of the infrastructure networks.

14. The image forming apparatus of claim 9, wherein the wireless communication interface unit ends the operation of the image forming apparatus as the soft AP when the connection between the image forming apparatus and the wireless device is ended.

15. The image forming apparatus of claim 9, wherein: the wireless communication interface unit searches for a list of infrastructure networks that can be wirelessly connected when the image forming apparatus is connected to the wireless device via the P2P function, and wherein the CPU generates the embedded web page based on a result of the searching.

16. An image forming system comprising: an image forming apparatus that executes a P2P function so that the image forming apparatus operates as a software access point (soft AP), and provides an embedded web page including a list of infrastructure networks that can be wirelessly connected to the image forming apparatus when the image forming apparatus is connected to an external wireless device via the P2P function; and a wireless device that displays the provided embedded web page, and receives access information of one of the infrastructure networks, to which the image forming apparatus is to be wirelessly connected via the displayed embedded web page, wherein the image forming apparatus receives the access information from the wireless device, and establishes a wireless network connection between the image forming apparatus and the one of the infrastructure networks based on the received access information; wherein the image forming apparatus attempts to connect to the infrastructure network by using the access information received from the wireless device; and ends the connection between the image forming apparatus and the wireless device via the P2P function, if connection to the infrastructure network is possible as a result of the connection attempt, and wherein the image forming apparatus establishes a wireless network connection between the image forming apparatus and the infrastructure network when the connection between the image forming apparatus and the wireless device is ended.

17. The image forming system of claim 16, wherein the image forming apparatus provides the embedded web page to the connected wireless device via web redirection when the image forming apparatus is connected to the wireless device via the P2P function.

18. The image forming system of claim 16, wherein the displayed embedded web page is a web page that provides a user interface screen for setting a wireless network connection between one of the infrastructure networks, to which the image forming apparatus can be wirelessly connected, and the image forming apparatus.

19. An image forming apparatus comprising: a wireless communication interface unit to perform a wireless communication function via which the image forming apparatus is wirelessly connected to an external wireless device; and a central processing unit (CPU) to generate, when the image forming apparatus is connected to the wireless device via the wireless communication function, an embedded web page including a list of infrastructure networks that are wirelessly connectable to the image forming apparatus, wherein the wireless communication interface unit provides the generated embedded web page to the connected wireless device, and receives connection information of the infrastructure networks input via the provided embedded web page, from the connected wireless device, and establishes a wireless network connection between the image forming apparatus and one of the infra networks based on the received connection information; wherein the wireless communication interface unit attempts to connect to the infrastructure network by using the connection information received from the wireless device; and ends the connection between the image forming apparatus and the wireless device via the wireless communication function, if connection to the infrastructure network is possible as a result of the connection attempt, and wherein the wireless communication interface unit establishes a wireless network connection between the image forming apparatus and the infrastructure network when the connection between the image forming apparatus and the wireless device is ended.

20. The image forming apparatus of claim 19, wherein the wireless communication interface unit provides the connected wireless device with the embedded web page via web redirection, when the image forming apparatus is connected to the wireless device via the wireless communication function.

21. The image forming apparatus of claim 19, wherein the wireless communication function comprises a function that uses at least one of P2P, Ad-hoc, Near Field Communication (NFC), Bluetooth, and Zigbee.

22. At least one non-transitory computer readable medium storing computer readable instructions that control at least one processor to implement the method of claim 1.

23. The method of claim 1, wherein the embedded web page provides a user interface screen for setting a wireless network connection between the infrastructure network, which is one of a plurality of infrastructure networks that can be wirelessly connected to the image forming apparatus.

* * * * *